Feb. 15, 1955 P. J. J. TERCÉ 2,701,984
DEVICE FOR LAUNCHING AND STABILIZATION OF ROCKETS
Filed Feb. 21, 1950 2 Sheets-Sheet 1
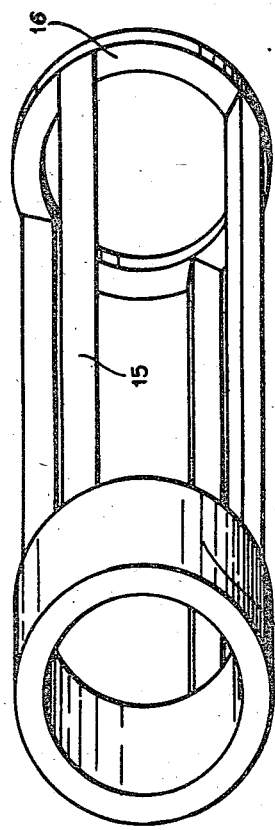
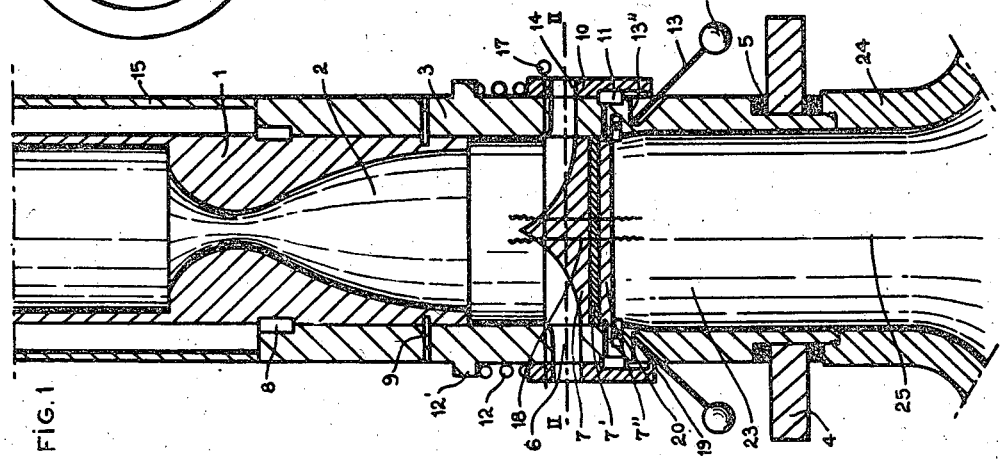
INVENTOR
PAUL JOSEPH JEAN TERCE
BY Feb. 15, 1955  P. J. J. TERCÉ  2,701,984
DEVICE FOR LAUNCHING AND STABILIZATION OF ROCKETS
Filed Feb. 21, 1950  2 Sheets-Sheet 2
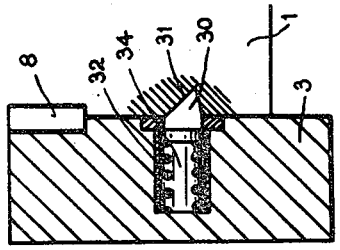
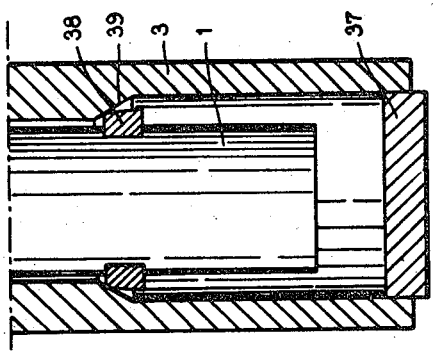
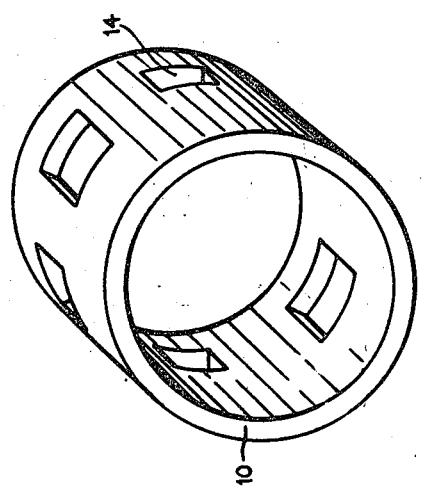
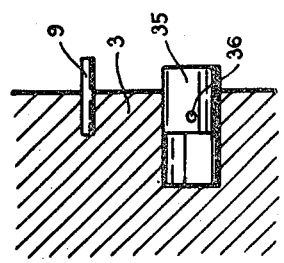
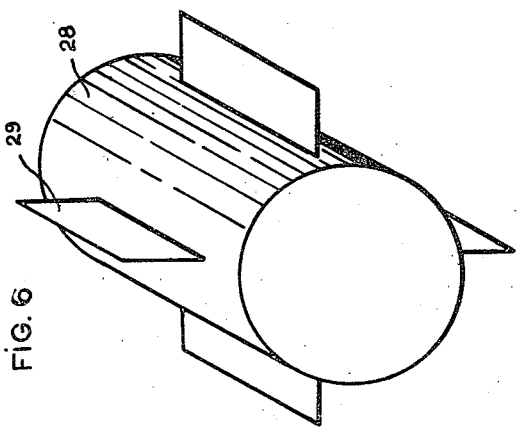
INVENTOR
PAUL JOSEPH JEAN TERCÉ
BY

United States Patent Office 2,701,984
Patented Feb. 15, 1955

2,701,984

DEVICE FOR LAUNCHING AND STABILIZATION OF ROCKETS

Paul Joseph Jean Tercé, Paris, France, assignor to Societe a Responsabilite Limitee S. E. R. A. M. Societe d'Etudes, de Recherches et d'Applications Mecaniques, Boulogne-sur-Seine, France, a French body corporate Application February 21, 1950, Serial No. 145,437

Claims priority, application France February 25, 1949

11 Claims. (Cl. 89—1.7)

The present invention relates to a device which, during the fixing operation of a rocket or like projectile, permits correlative movements of translation and rotation around the axis of the projectile, thus securing under most favourable conditions the stability of the rocket as well at the start as on its trajectory by the simple use of the self propelling charge of the rocket.

The device allows a good efficiency of the self propelling charge to be obtained as well as an accuracy similar to that of artillery shells and remains nevertheless light and of very small overall size.

Some embodiments of the device according to the invention allow rockets of the ordinary type to be used at the cost of very small external alterations. They can be operated as well for an individual as for a combined launching of rockets. The launching devices can be transported loaded beforehand and mounted on a platform to allow the firing of the rockets to be performed straight from these platforms without the adjunction of implements, appropriate elements being provided in such a case, to secure a fairly complete safety during transportation.

The device according to the invention may be easily combined with any apparatus for automatic or semi-automatic supply.

With these and other objects in view, the device according to the invention comprises a rotatably mounted member to support the rocket, temporary connecting means for locking the rocket to said rotatable member till the obtainment of launching conditions, means to set fire to the self-propelling charge of the rocket, means to rotate together the rotatable member and the rocket under the action of gases generated by combustion, and means to automatically release said locking connecting means as soon as the said launching conditions are reached.

The device according to the invention allows:

(a) Employing the initial combustion of the self propelling charge to impart to the rocket, before starting, a given rotation speed around its axis;

(b) Automatically insuring the starting of the rocket, when the initial rotation speed reaches the desired value;

(c) Progressively slowing the rotation of the rocket around its axis, first during the self propelling period, and afterwards during the first part of the free trajectory of the rocket, so as to reduce in due time to a given value the ratio of the rotational speed of the rocket around its axis to the translational speed.

The first two effects are obtained by devices causing the initial (or essential) stabilization and the starting of the rocket by imparting to the rocket a rotational movement before launching.

The third effect is obtained by means of devices restraining the rotation and realizing the progressive stabilization.

The value of the initial rotational speed and the value of the final ratio of the rotational speed to the translational speed are two independent figures. This independence which results from the operation of the devices according to the invention, allows an optimum value to be assigned to each of these figures so as to obtain the greatest possible accuracy for the rocket.

An embodiment of the invention will be described hereafter by way of example with reference to the accompanying drawing.

Fig. 1 is an axial section of the starting device.

Fig. 2 is a section on the line II—II of Fig. 1,

Figs. 3 and 4 are perspective views of two elements of said device,

Fig. 5 is a part of an axial section on a larger scale,

Fig. 6 is a perspective view of the rocket equipped with stabilizing organs,

Figs. 7, 8, 9 show axial sections of three other forms of the locking means between the rocket and the starting devices respectively.

As shown in Fig. 1, the base of the rocket, represented in the drawing as a rocket with a fixed axial nozzle 2, is inserted in a launching tube or mortar 3. This mortar is mounted on a fixed support 4, around which it can rotate freely, by means, for instance, of a ball bearing connection 5.

Nozzles 6, the shape of which is shown in Fig. 2, are cut in the wall of the mortar 3. A deflecting element 7 (Fig. 1), guides the gases escaping from the nozzle 2 of the rocket towards the mouth of the nozzles 6 in the mortar. An elastic cushion 7' is inserted between the deflecting element 7 and the base 7" of the mortar.

Longitudinal keys, such as 8, couple the rocket together with the mortar for rotational movement around their common axis, and also mount the rocket for longitudinal movement in the mortar.

Transverse keys such as 9, which are sheared by a given strain, prevent any longitudinal movement of the rocket as long as the pressure applied on the rocket by the combustion gases of the charge has not reached the limit value of the shearing strain.

An outer sleeve 10 is fitted on the mortar so as to easily slide on it, axially or helically, in the direction given by the guides 11 which are shown in Fig. 1 as longitudinal guides. The sleeve is biased towards the fixed support and into a retracted position by the action of a spring 12 which rests on the ledge 12' of the mortar and is movable away from said fixed support into an advanced position by a ball type centrifugal governor 13' fastened to the mortar by the shafts 13", the governor including the arms 13.

The sleeve 10 is provided, as is shown in the perspective view of Fig. 3, with apertures 14 corresponding to the exhaust ports of the cross nozzles 6. When the sleeve is in the depressed position illustrated in Fig. 1, all the exhaust ports of the nozzles 6 are cleared.

When the charge in the rocket is ignited, the gases flowing through the nozzles 6 cause the rotation of the mortar and also of the rocket, driven by the keys 8. The pins 9 prevent the starting of the rocket, but as the rotation speed of the mortar and rocket around their common axis increases, the sleeve moves towards a raised position under the action of the governor 13. The apertures 14 are so made that during this progression of the sleeve, the exhaust ports of the nozzles are closed progressively, one after another. Therefore, the overpressure in the mortar increases constantly and for a given value of this pressure, in relation with a given rotation speed, the pins 9 are sheared off and the rocket starts.

As shown in perspective view of Fig. 4, longitudinal slides 15, joined at their upper ends to a centering ring 16, are mounted on the mortar 3 to facilitate carrying and centering of the rocket before firing, and to guide the rocket upon firing.

As shown in Fig. 1, safety pins 17 are provided for use during transportation to lock the sleeve 10 on the mortar 3 and to further short circuit the wires feeding the firing circuit of the rocket. In case of an accidental ignition, the increasing rotation of the mortar cannot cause the upward movement of the sleeve (locked by the pins 17), as shown on an enlarged scale in Fig. 5. After about one-tenth of a second, the pressure on plug 21 (comprising elements 7, 7' and 7") serves to shear off pins 22. Latches 19, cooperating with pins 20 are not sufficiently strong to withstand the pressure of plug 21 in the absence of pins 22, and consequently these latches 19 are also sheared off. In the absence of these retaining elements, the plug 21 is ejected through the aperture 23 in the fixed support 4 and the mounting 24 which is an extension rearwards of the support. The inside of this mounting forms an expansion chamber 25. At the bottom of this chamber is a recess 26 in the axis of the aperture 23, lined with a plastic cushion 26'; the plug 21 is driven into the cushion, whilst the gases
expand sideways through the deflectors 27. These deflectors provide for an additional expansion of the gases
of the self-propelling charge, so as to strongly decrease
their exhaust temperature and reduce the fire risks. The
deflectors are otherwise shaped so as to render negligible
the resultant of their thrusts.

As shown in perspective view of Fig. 6, the body 28 of
the rocket carries blades 29 obliquely arranged with respect to the axis of the rocket. The object of these
blades is to reduce the rotation of the rocket after the
start and to bring progressively the ratio of the rotational
speed to the translational speed to its optimum value on
the trajectory.

When the rocket is provided with one or several nonaxial nozzles, the restraining of the rotation, after the
start, is principally performed during the self propelling
stage, by giving to these nozzles the required slope; the
blades exist still, but their action becomes, in such a
case, of minor importance.

As shown in cross section in Fig. 7, a simplified arrangement, according to the invention, consists in locking
the bottom of the rocket 1 in the mortar 3 by means of
latches 30 fitted in recesses 31 of the body of the rocket,
and urged by springs 32, Longitudinal keys 8 prevent
the rotation of the rocket in the mortar. When, after
the igniting of the propelling charge, the assembly of
the rocket and the mortar takes a progressively increasing speed of rotation around the common axis of the
two elements, the latches 30, under the action of centrifugal force, compressing the springs 32, are drawn
aside in the recesses 34 of the mortar, and set free the
rocket.

In the alternative embodiment shown in Fig. 8 transverse pins 9 are also provided as in Fig. 1. Latches 35
are held in position by the pins 36 which, at a given
speed are sheared by centrifugal force. The latches
then are drawn aside and the rocket is held only by the
pins 9 which are unable, in this case, to resist alone the
thrust of the rocket.

In another embodiment of the invention, shown in
cross section in Fig. 9, the mortar 3 is equipped with a
rear breech block 37. The rocket is inserted in the
mortar through the rear. The bottom of the rocket carries at the front part a plastic ring 38 which rests on a
cone 39 formed at the nozzle of the mortar. The sizes
of the ring and the cone are calculated so that the forcing
of the ring in the cone is carried on regularly under the
thrust of the rocket gases and so that the rotation speed
of the rocket is as uniform as possible.

Various changes and modifications may be made without departing from the spirit and scope of the present
invention and it is intended that such obvious changes
and modifications be embraced by the annexed claims.

Having thus described the invention, what is claimed
as new and desired to be secured by Letters Patent, is:

1. A device for launching and stabilizing a rocket having a self-propelling charge, comprising a rotatably
mounted member to support said rocket, temporary connections to rigidly lock said rocket to said rotatable
member, means for causing explosion of said self-propelling charge of said rocket, means to rotate together
said rotatable member and said rocket through the action
of the gases emanating from the combustion of said
self-propelling charge of said rocket from the inception
of said combustion, means responsive to the rotational
speed of the assembly of said member and said rocket
and operative to automatically release said temporary
connections.

2. A device for launching and stabilizing a rocket having a self-propelling charge, comprising a rotatably
mounted member to support said rocket, temporary connections to rigidly lock said rocket to said rotatable
member, means for causing explosion of said self-propelling charge of said rocket, means to rotate the assembly of said rotatable member and said rocket in response to the gases emanating from the combustion of
said self-propelling charge of said rocket from the inception of said combustion, means responsive to the
pressure of the combustion gases of said charge and
operative to automatically release said temporary locking
connections when the thrust exerted by the pressure of
the combustion gases of said charge has reached a predetermined value.

3. A device for launching and stabilizing a rocket having a self-propelling charge, comprising a mortar having
a fixed support, a rotatably mounted tube on said support, radial pins for temporarily locking said rocket
within said rotatable tube, deflectors and exhaust nozzles
adapted to receive the combustion gases generated from
the combustion of the self-propelling charge provided
at the base of said tube and operative to impart to said
tube a rotational movement in response to the generation of said gases, and centrifugal means responsive to
the rotational speed of the assembly of said tube and said
rocket and operative to obstruct said exhaust nozzles.

4. A device for launching and stabilizing a rocket having a self-propelling charge, comprising a mortar having
a fixed support, a rotatably mounted tube on said support, radial pins for temporarily locking said rocket within said rotatable tube, deflectors and exhaust nozzles
adapted to receive the gases generated from the combustion of the self-propelling charge provided at the
base of said tube and operative to impart to said tube a
rotational movement in response to the generation of
said gases, a tubular sleeve slidably mounted on said tube
for movement to and from a retracted position and provided with apertures coinciding in said retracted position
with said exhaust nozzles, a centrifugal governor mounted on said rotatable tube for controlling the movements
of said tubular sleeve, and spring means for normally
maintaining said tubular sleeve in said retracted position.

5. A device for launching and stabilizing a rocket
having a self-propelling charge, comprising a mortar
having a fixed hollow support, a rotatably mounted tube
on said support, radial pins for temporarily locking said
rocket within said rotatable tube, a removable base at
the lower end of said tube, connecting means between
said base and said tube which are breakable in response
to a predetermined pressure whereby said base falls
through said hollow support, deflectors provided on said
removable base, exhaust nozzles adapted to receive the
gases generated from the combustion of said self-propelling charge of said rocket arranged at the lower end
of said tube and operative to impart to said tube a rotational movement in response to the generation of said
gases, means responsive to centrifugal force for obstructing said exhaust nozzles when the rotational speed
of the assembly of said tube and rocket has reached a
predetermined value, and safety exhaust means arranged
in said hollow support of said mortar.

6. A device for launching and stabilizing a rocket
having a fixed hollow support, a rotatably mounted tube
on said support, radially disposed spring urged means
for temporarily locking said rocket within said tube, said
means being arranged to be retracted in response to
centrifugal force, means to fire the self-propelling charge
of said rocket, deflectors and exhaust nozzles adapted
to receive the combustion gases generated by the combustion of said charge provided at the lower end of said
tube and operative to impart a rotational movement to
said tube in response to the generation of said gases.

7. A device for launching and stabilizing a rocket
having a self-propelling charge, comprising a mortar
having a fixed support, a rotatably mounted tube on said
support, radial latches for locking said rocket within
said tube, pins for holding said latches in place and
adapted to be sheared in response to a predetermined
centrifugal force developed by the rotation of the assembly of said tube and rocket, means for firing the selfpropelling charge of said rocket, and deflectors and exhaust nozzles adapted to receive the gases generated by
the combustion of said charge provided at the lower
end of said tube and operative to impart to said tube a
rotational movement in response to the generation of
said gases.

8. A device for launching and stabilizing a rocket
having a self-propelling charge, comprising a rotatably
mounted member adapted to support said rocket and including longitudinal guide and centering means for said
rocket, temporary connections for locking said rocket to
said rotatable member, means to explode said self-propelling charge of said rocket, means to rotate the assembly of said rotatable member and rocket in response to
the gases generated by the combustion of said self-propelling charge of said rocket from the inception of said
combustion, and means to automatically release said
locking connections in response to a predetermined pressure established by said gases.

9. A device for launching and stabilizing a rocket having a self-propelling charge, comprising a rotatably mounted tube, temporary connections for locking said rocket within said rotatable tube, means to explode said self-propelling charge of said rocket, means to rotate the assembly of said rotatable tube and rocket in response to the gases generated by the combustion of said self-propelling charge from the inception of said combustion, longitudinal bars projecting from the top of said rotatable tube and parallel to the axis thereof for guiding and centering said rocket, means for firmly connecting together the outer ends of said bars, and means to automatically release said locking connections between said rocket and said rotatable tube in response to a predetermined pressure established by said gases.

10. A device for launching and stabilizing rockets having a propelling charge, comprising a rotatably mounted member to support the rocket, temporary connecting means for locking the rocket to said rotatable member till launching conditions are reached, means to ignite the self-propelling charge of the rocket, means to rotate together the rotatable member and the rocket under the action of gases generated by combustion, and means to automatically release said locking connecting means as soon as the said launching conditions are reached.

11. A device for launching and stabilizing rockets having a propelling charge, comprising a movably mounted member to support the rocket, means adapted to lock the rocket to said member prior to launching conditions of said rocket, means for firing said self-propelling charge of the rocket, means imparting rotational movement to said member and to the rocket under the action of gases generated by combustion, and means automatically releasing said locking means as soon as said launching conditions for the rocket are reached.

References Cited in the file of this patent

FOREIGN PATENTS

| | | |
|---|---|---|
| 25,005 | Great Britain | of 1893 |
| 25,327 | Great Britain | of 1894 |
| 689,095 | France | May 20, 1930 |